(12) United States Patent
Wu et al.

(10) Patent No.: US 10,447,190 B2
(45) Date of Patent: Oct. 15, 2019

(54) MULTI-LOOP SWITCHING CONTROL SYSTEM FOR DOUBLY-FED WIND TURBINE BASED ON LOGIC SWITCH CONTROL

(71) Applicant: South China University of Technology, Guangzhou (CN)

(72) Inventors: Qinghua Wu, Guangzhou (CN); Yang Liu, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 15/759,344

(22) PCT Filed: Dec. 9, 2016

(86) PCT No.: PCT/CN2016/109193
§ 371 (c)(1),
(2) Date: Mar. 12, 2018

(87) PCT Pub. No.: WO2017/133318
PCT Pub. Date: Aug. 10, 2017

(65) Prior Publication Data
US 2018/0254725 A1 Sep. 6, 2018

(30) Foreign Application Priority Data
Feb. 1, 2016 (CN) .......................... 2016 1 0073358

(51) Int. Cl.
*H02P 9/02* (2006.01)
*H02J 3/38* (2006.01)
(Continued)

(52) U.S. Cl.
CPC .................. *H02P 9/02* (2013.01); *H02J 3/18* (2013.01); *H02J 3/38* (2013.01); *H02J 3/386* (2013.01);
(Continued)

(58) Field of Classification Search
CPC .. H02P 9/02; H02P 9/007; H02P 21/50; H02J 3/18; H02J 3/38
See application file for complete search history.

(56) References Cited

U.S. PATENT DOCUMENTS

2012/0056602 A1* 3/2012 Li .............................. H02P 9/48
322/89
2013/0009610 A1 1/2013 Niiranen et al.
(Continued)

FOREIGN PATENT DOCUMENTS

| CN | 102592026 A | 7/2012 |
|----|-------------|--------|
| CN | 105591403 A | 5/2016 |

OTHER PUBLICATIONS

Li et al., "Double-fed wind power generation technologies based on vector control", East China Electric Power, Mar. 31, 2009, ISSN: 1001-9529, pp. 456-460, vol. 37:3, English-language Abstract.
(Continued)

*Primary Examiner* — Sean Gugger
(74) *Attorney, Agent, or Firm* — The Webb Law Firm (57) ABSTRACT

A multi-loop switching control system for a doubly-fed wind turbine based on logic switch control. Output variables of the doubly-fed wind turbine may be used to form output feedback control channels. Each output feedback control channel may switch between a switch controller and a vector controller to form a multi-loop switching controller. When a power system associated with the doubly-fed wind turbine is subjected to a relatively large external disturbance, state variables and the output variables of the wind turbine deviate from an original balance point, and the output feedback control loops of the doubly-fed wind turbine are switched from the vector controller to the switch controller. Under control of the switch controller, the state variables and output variables return to a vicinity of the original balance point, and the output feedback control loops of the wind turbine are switched from the switch controller to the vector controller.

9 Claims, 5 Drawing Sheets

(51) Int. Cl.
*H02J 3/18* (2006.01)
*H02P 9/00* (2006.01)
*H02P 21/00* (2016.01)
*H02P 101/15* (2016.01)
*H02J 3/50* (2006.01)

(52) U.S. Cl.
CPC .............. *H02P 9/007* (2013.01); *H02P 21/50* (2016.02); *H02J 3/50* (2013.01); *H02P 2101/15* (2015.01); *Y02E 40/30* (2013.01)

(56) References Cited

U.S. PATENT DOCUMENTS

2013/0265013 A1* 10/2013 Cao .................... H02P 21/12
322/99
2013/0279214 A1* 10/2013 Takase .................. H02M 7/68
363/37
2018/0254628 A1* 9/2018 Schelenz ................ H02J 3/18

OTHER PUBLICATIONS

Wei et al., "Study on AC-excited Control Strategy of Doubly-fed VSCF Wind Power Generation System", Electric Drive, Jan. 31, 2010, ISSN: 1001-2095, pp. 27-32, vol. 40:1.

* cited by examiner

MULTI-LOOP SWITCHING CONTROL SYSTEM FOR DOUBLY-FED WIND TURBINE BASED ON LOGIC SWITCH CONTROL

CROSS-REFERENCE TO RELATED APPLICATIONS

This application is the United States national phase of International Application No. PCT/CN2016/109193 filed Dec. 9, 2016, and claims priority to Chinese Patent Application No. 201610073358.6 filed Feb. 1, 2016, the disclosures of which are hereby incorporated in their entirety by reference.

BACKGROUND OF THE INVENTION

Field of the Invention

Non-limiting embodiments or aspects relate to power system automation technology and, for example, to a multi-loop switching control system for a doubly-fed wind turbine based on logic switch control.

Description of Related Art

With the large-scale development of renewable energy, a proportion of wind power in power systems is increasing, which makes controlling a transient stability of traditional power systems more challenging. For example, an emergence of small-probability major failures places higher requirements on a low voltage ride through capability of a wind generator. Doubly-fed induction wind turbines account for a significant proportion of current wind power generation. Traditional vector control algorithms of doubly-fed wind turbines decouple active and reactive control loops based on a, stator flux linkage or a stator voltage coordinate system, and achieves a maximum power tracking and an active-reactive coordinated control of the doubly-fed wind turbine with proportional integral (PI) control. Tuning of a traditional PI control system considers a rapidity and steady-state error of a system response synthetically, and determines a compromise control parameter. However, after a power system is greatly disturbed (e.g., suffers a three-phase short circuit fault, etc.), a doubly-fed wind turbine deviates from the original operation point. Traditional vector control systems cannot exert a maximum control energy of the wind turbine converter, so that the wind turbine can return to the original balance point as fast as possible to continue running. Therefore, the traditional vector control systems cannot guarantee stable operation of a doubly-fed wind turbine when there is a small-probability major failure in the power system.

SUMMARY

In some non-limiting embodiments or aspects, a control potential of a doubly-fed wind turbine converter is increased by providing a control system of the doubly-fed wind turbine as a switch control system. For example, a traditional method of switch control obtains a control law by solving the Hamiltonian equation of the system using the maximum principle. The switch control system can increase (e.g., increase, maximize, etc.) a performance of the control system to cause the controlled system to dynamically exhibit an optimal time. However, to build the Hamiltonian function of a large-scale power system, the traditional switch control system uses all state variables of all parameters of the entire system, and the resulting Hamiltonian equation is very complicated, which increases a difficulty of solving the canonical equation of the system. In some non-limiting embodiments or aspects, a switch control method based on logic operation avoids the problem of the traditional switch control method relying on the Hamiltonian equation of the system to obtain the control law, while maintaining the advantages of the time optimality of the traditional method. In this way, applying a switch control method based on logic operation to control of doubly-fed wind turbines greatly enhances a robustness of the doubly-fed wind turbines after the power system is disturbed (e.g., suffers a three-phase short circuit fault, etc.). Further, because the switch control system based on logic operation may only use the relative order information of the system, e.g., without the precise parameters of the system, the switch control system shows strong robustness to changes of system operating conditions.

According to some non-limiting embodiments or aspects, provided is a multi-loop switching control system for a doubly-fed wind turbine based on logic switch control that overcomes shortcomings and deficiencies of traditional or conventional control systems. For example, a control system according to a non-limiting embodiment or aspect enhances an ability of a doubly-fed wind turbine to maintain stable operation after being subjected to a large disturbance. In an early stage of power system transient oscillation, potentials of the doubly-fed wind turbine converter may be fully utilized, so that output of the doubly-fed wind turbine, for example, generator rotor speed, stator reactive power output, grid-side converter reactive power output, converter capacitor terminal voltage, and/or the like, converge to a vicinity of the balance point (e.g., to substantially equal to the balance point, to within a threshold level of the balance point, etc.) at a faster or fastest speed, and then the system can gradually stabilize to the original balance point through traditional vector control system.

According to some non-limiting embodiments or aspects, provided is a multi-loop switching control system for a doubly-fed wind turbine based on logic switch control having a control object of a doubly-fed wind turbine converter. The control system includes four input signals, respectively a doubly-fed wind turbine rotor speed deviation $e_{\omega_r} = \omega_r - \omega_r^*$, a doubly-fed wind turbine stator reactive power output deviation $e_{Q_s} = Q_s - Q_s^*$, a doubly-fed wind turbine converter capacitor voltage deviation $e_{V_{dc}} = V_{dc} - V_{dc}^*$, and a doubly-fed wind turbine grid-side converter reactive power output error $e_{Q_g} = Q_g - Q_g^*$. The control system includes four output signals, respectively a doubly-fed wind turbine rotor-side converter q-axis control voltage $v_{qr}^*$, a doubly-fed wind turbine rotor-side converter d-axis control voltage $v_{dr}^*$, a doubly-fed wind turbine grid-side converter d-axis control voltage $v_{dg}^*$, and a doubly-fed wind turbine grid-side q-axis control voltage $v_{qg}^*$. The four output signals and the four input signals respectively correspond to four feedback control channels.

In some non-limiting embodiments or aspects, the control system includes a doubly-fed wind turbine rotor speed control loop based on traditional vector control method, a doubly-fed wind turbine rotor speed switch control loop based on second-order logic switch controller, a doubly-fed wind turbine stator reactive power control loop based on traditional vector control method, a doubly-fed wind turbine stator reactive power control loop based on first-order logic switch controller, a doubly-fed wind turbine converter capacitor voltage control loop based on traditional vector control method, a doubly-fed wind turbine capacitor voltage control loop based on second-order logic switch controller, a doubly-fed wind turbine grid-side converter reactive power control loop based on traditional vector control method, a doubly-fed wind turbine grid-side converter reactive power control loop based on first-order logic switch controller and a doubly-fed wind turbine rotor speed control loop switching control unit, a doubly-fed wind turbine stator reactive power control loop switching unit, a doubly-fed wind turbine converter capacitor voltage control loop switching control unit, a doubly-fed wind turbine grid-side reactive power control loop switching unit, wherein the doubly-fed wind turbine rotor speed deviation $e_{\omega_r} = \omega_r - \omega_r^*$ signal passes through the doubly-fed wind turbine rotor speed control loop based on traditional vector control method, the doubly-fed wind turbine rotor speed switch control loop based on second-order logic switch controller and the doubly-fed wind turbine rotor speed control loop switching control unit, and then outputs the doubly-fed wind turbine rotor-side converter q-axis control voltage $v_{qr}^*$ the doubly-fed wind turbine stator reactive power output deviation $e_{Q_s} = Q_s - Q_s^*$ passes through the doubly-fed wind turbine stator reactive power control loop based on traditional vector control method, and the doubly-fed wind turbine stator reactive power control loop based on first-order logic switch controller and the doubly-fed wind turbine stator reactive power control loop switching unit and then outputs the doubly-fed wind turbine rotor-side converter d-axis control voltage $v_{dr}^*$, the doubly-fed wind turbine converter capacitor voltage error $e_{V_{dc}} = V_{dc} - V_{dc}^*$ passes through the doubly-fed wind turbine converter capacitor voltage control loop based on traditional vector control method, the doubly-fed wind turbine converter capacitor voltage control loop based on second-order logic switch controller and the doubly-fed wind turbine converter capacitor voltage control loop switching control unit and then outputs the doubly-fed wind turbine grid-side converter d-axis control voltage $v_{dg}^*$, and the doubly-fed wind turbine grid-side converter output reactive power error $e_{Q_g} = Q_g - Q_g$ passes through the doubly-fed wind turbine grid-side converter reactive power control loop based on traditional vector control method, the doubly-fed feeder grid-side converter reactive power control loop based on first-order logic switch controller, and the doubly-fed wind turbine grid-side reactive power control loop switching unit, and then outputs the doubly-fed wind turbine grid-side converter q-axis control voltage $v_{qg}^*$.

In some non-limiting embodiments or aspects, the doubly-fed wind turbine rotor speed control loop switching control unit is configured to control a switching action between the doubly-fed wind turbine rotor speed control loop based on traditional vector control method and the doubly-fed wind turbine rotor speed switch control loop based on second-order logic switch controller;

the doubly-fed wind turbine rotor speed control loop based on traditional vector control method is configured to, when the doubly-fed wind turbine rotor speed control loop switching control unit switches a control signal to the doubly-fed wind turbine rotor speed control loop based on traditional vector control method, provide the appropriate control voltage $v_{qr\_VC}^*$ according to the doubly-fed wind turbine rotor speed deviation;

the doubly-fed wind turbine rotor speed switch control loop based on second-order logic switch controller is configured to, when the doubly-fed wind turbine rotor speed switch control loop switches a control signal to a doubly-fed wind turbine rotor speed control loop based on second-order logic switch controller, provide the appropriate control voltage $v_{qr\_LB}^*$ according to the doubly-fed wind turbine rotor speed deviation;

the doubly-fed wind turbine stator reactive power control loop switching unit is configured to control a switching action between the doubly-fed wind turbine stator reactive power control loop based on traditional vector control method and the doubly-fed wind turbine stator reactive power control loop based on first-order logic switch controller;

the doubly-fed wind turbine stator reactive power control loop based on traditional vector control method is configured to, when the doubly-fed wind turbine stator reactive power control loop switching unit switches a control signal to the doubly-fed wind turbine stator reactive power control loop based on traditional vector control method, provide the appropriate control voltage $v_{dr\_VC}^*$ according to the doubly-fed wind turbine stator reactive power output error;

the doubly-fed wind turbine stator reactive power control loop based on first-order logic switch controller is configured to: when the doubly-fed wind turbine stator reactive power control loop switching unit switches a control signal to the doubly-fed wind turbine stator reactive power control loop based on first-order logic switch controller, provide the appropriate control voltage $v_{dr\_LB}^*$ according to the doubly-fed wind turbine stator reactive power output error;

the doubly-fed wind turbine converter capacitor voltage control loop switching control unit is configured to control a switching action between the doubly-fed wind turbine converter capacitor voltage control loop based on traditional vector control method and the doubly-fed wind turbine converter capacitor voltage control loop based on second-order logic switch controller;

the doubly-fed wind turbine converter capacitor voltage control loop based on traditional vector control method is configured to, when the doubly-fed wind turbine converter capacitor voltage control loop switching control unit switches a control signal to the doubly-fed wind turbine capacitor voltage control loop based on traditional vector control method, provide the appropriate control voltage $v_{dg\_VC}^*$ according to the doubly-fed wind turbine capacitor voltage deviation;

the doubly-fed wind turbine converter capacitor voltage control loop based on second-order logic switch controller is configured to, when the doubly-fed wind turbine converter capacitor voltage control loop switching control unit switches a control signal to the doubly-fed wind turbine converter capacitor voltage control loop based on second-order logic switch controller, provide the appropriate control voltage $v_{dg\_LB}^*$ according to the doubly-fed wind turbine converter capacitor voltage deviation;

the doubly-fed wind turbine grid-side converter reactive power control loop switching unit is configured to control a switching action between the doubly-fed wind turbine grid-side converter reactive power control loop based on traditional vector control method and the doubly-fed wind turbine grid-side converter reactive power control loop based on first-order logic switch controller;

the doubly-fed wind turbine grid-side converter reactive power control loop based on traditional vector control method is configured to, when the doubly-fed wind turbine grid-side converter reactive power control loop switching unit switches a control signal to the doubly-fed wind turbine grid-side converter reactive power control loop based on tradition vector control method, provide the appropriate control voltage $v_{qg\_VC}^*$ according to the doubly-fed wind turbine grid-side converter reactive power output error;

the doubly-fed wind turbine grid-side converter reactive power control loop based on first-order logic switch controller is configured to: when the doubly-fed wind turbine grid-side converter reactive power control loop switching unit switches a control signal to doubly-fed wind turbine grid-side converter reactive power control loop based on first-order logic switch controller, provide the appropriate control voltage $v_{qg\_LB}^*$ according to the doubly-fed wind turbine grid-side converter reactive power output error.

In some limiting embodiments or aspects, the first-order logic switch controller generates a control signal based on a logic operation, and the control logic is:

$$q(t)=G(e(t),\varphi_0^+-\varepsilon_0^+,\varphi_0^-+\varepsilon_0^-,q(t-)), q(0-)=q^0 \in \{\text{true, false}\}$$

where $q(t)$ is the output of the control logic, $G(e, \bar{e}, \underline{e}, q_{old})=[e \geq \bar{e} \vee (e > \underline{e} \wedge q_{old})]$, e is the tracking error output by the system, $\bar{e}$ is the upper bound of the tracking error, $q_{old}$ is the lower bound of the tracking error, $q_{old}$ is the logic value of the previous time step corresponding to the logic variable, $\wedge$ is the logic AND operation, $\vee$ is the logic OR operation, $\varphi_0^+$ and $\varphi_0^-$ define the error interval of the tracking error of the output variable, i.e. $F_0:=\{e \in L \mid \varphi_0^- \leq e \leq \varphi_0^+\}$, $\varepsilon_0^+$ and $\varepsilon_0^-$ define the safety distance within $F_0$, and $q(t-)$ is the logic value of $q(t)$ at the previous moment.

In some non-limiting embodiments or aspects, the second-order logic switch controller generates a control signal based on a logic operation, and the control logic is:

$$q_1(t) = G(e(t), \varphi_0^+ - \varepsilon_0^+, \varphi_0^- + \varepsilon_0^-, q_1(t-)), q_1(0-) = q_1^0 \in \{\text{true, false}\}$$

$$q(t) = \begin{cases} G(\dot{e}(t), -\lambda_1^- - \varepsilon_1^+, \varphi_1^- + \varepsilon_1^-, q(t-)), & \text{if } q_1(t) = \text{true} \\ G(\dot{e}(t), \varphi_1' - \varepsilon_1^+, \lambda_1^+ + \varepsilon_1^-, q(t-)), & \text{if } q_1(t) = \text{false} \end{cases}$$

$$q(0-) = q^0 \in \{\text{true, false}\}$$

where $\varphi_1^+$ and $\varphi_1^-$ define the error interval of the first derivative of the output variable, i.e. $F_1:=\{\dot{e} \in \square \mid \varphi_1^- \leq \dot{e} \leq \varphi_1^+\}$, $\varepsilon_1^+$ and $\varepsilon_1^-$ define the safe distance within $F_1$, $\lambda_1^+$ and $\lambda_1^-$ are the increasing and decreasing velocity of ideal e within $F_0$, and $q_1(t-)$ is the logic value of $q_1(t)$ at the previous moment.

In some non-limiting embodiments or aspects, the control law of the second-order logic switch controller in the doubly-fed wind turbine rotor speed switch control loop based on second-order logic switch controller is:

$$v_{qr}(t) = \begin{cases} v_{qr\_max}, & \text{if } q(t) = \text{false} \\ v_{qr\_min}, & \text{if } q(t) = \text{true} \end{cases}$$

where $v_{qr}$ is the q-axis component of the rotor-side converter voltage, $v_{qr\_max}$ is the maximum value of the q-axis component of the rotor-side converter voltage and $v_{qr\_min}$ is the minimum value of the q-axis component of the rotor-side converter voltage.

In some non-limiting embodiments or aspects, the control law of the first-order logic switch controller in the doubly-fed wind turbine stator reactive power control loop based on first-order logic switch controller is:

$$v_{dr}(t) = \begin{cases} v_{dr\_max}, & \text{if } q(t) = \text{true} \\ v_{dr\_min}, & \text{if } q(t) = \text{false} \end{cases}$$

where $v_{dr}$ is the d-axis component of the rotor-side converter voltage, $v_{dr\_max}$ is the maximum value of the d-axis component of the rotor-side converter voltage and $v_{dr\_min}$ is the minimum of the d-axis component of the rotor-side converter voltage.

In some non-limiting embodiments or aspects, the control law of the first-order logic switch controller in the doubly-fed wind turbine grid-side converter reactive power control loop is:

$$v_{qg}(t) = \begin{cases} v_{qg\_min}, & \text{if } q(t) = \text{true} \\ v_{qg\_max}, & \text{if } q(t) = \text{false} \end{cases}$$

where $v_{qg}$ is the q-axis component of the grid-side converter voltage, $v_{qg\_max}$ is the maximum value of the q-axis component of the grid-side converter voltage and $v_{qg\_min}$ is the minimum value of the q-axis component of the grid-side converter voltage.

In some non-limiting embodiments or aspects, the control law of the second-order logic switch controller in the doubly-fed wind turbine converter capacitor voltage control loop based on second-order logic switch controller is:

$$v_{dg}(t) = \begin{cases} v_{dg\_max}, & \text{if } q(t) = \text{true} \\ v_{dg\_min}, & \text{if } q(t) = \text{false} \end{cases}$$

where $v_{dg}$ is the d-axis component of the grid-side converter voltage, $v_{dg\_max}$ is the maximum value of the d-axis component of the grid-side converter voltage and $v_{dg\_min}$ is the minimum value of the d-axis component of the grid-side converter voltage.

In some non-limiting embodiments or aspects, the control system further includes a switching excitation controller, and the switching strategy is:

it is assumed that after the power system is perturbed, the extreme value sequence in the oscillation trajectory of the absolute value $|e(t)|$ of the output variable of the doubly-fed wind turbine is $\Gamma(t)=\{\Gamma_1, \Gamma_2, \ldots, \Gamma_j\}$, where $\Gamma_s=(s \in \{1, 2, \ldots, j\})$ is the maximum value in the sequence $\Gamma(t)$, and the switching strategy of each loop in the control system is as follows: when switching condition 1 is met, the switching control system is switched from the conventional vector controller to the switch controller; when switching condition 2 is met, the switching control system is switched from the switch controller to the conventional vector controller, switching condition 1: $|e(t)| \geq \bar{\omega}$;

switching condition 2: {the switching excitation controller's switching frequency reaches the maximum value that the device can withstand} $\{\{(\Gamma_s-\Gamma_j)/\Gamma_s \geq \tau\} \wedge \{e(t)$ converge to $[2(\varphi_0^-+\varepsilon_0^-), 2(\varphi_0^++\varepsilon_0^+)]\}\}$; where $\bar{\omega}$ and $\tau$ are the parameters that the switching excitation controller.

According to some non-limiting embodiments or aspects, provided is a mufti-loop switching control system for a doubly-fed wind turbine based on logic switch control that enables improved performance (e.g. gives full play to a maximum performance) of the doubly-fed wind turbine converter. At an initial stage of transient oscillation of the power system, the four output variables of the doubly-fed wind turbine converge to the vicinity of the balance point through the switch control system at the fastest speed within a temporary area, and then switch to the conventional vector control system. An optimum of the conventional vector control system in the vicinity of the balance point can be achieved (e.g., is played the best, etc.), and the system gradually stabilizes to the original balance point.

According to some non-limiting embodiments or aspects, provided is a multi-loop switching control system for a doubly-fed wind turbine based on switch control that includes only logic operations so that a phase lag between the output and the input is smaller than that of a conventional vector control system. In this way, the switch control system can respond to the oscillation of the output variable of the doubly-fed wind turbine more quickly, and the control signal of the switch control system only has two values to facilitate the transmission of the control signal.

According to some non-limiting embodiments or aspects, provided is a multi-loop switching control system for a doubly-fed wind turbine based on logic switch control that when applied in coordinated control of a doubly-fed wind turbine can greatly improve the transient stability of the operation of a power system containing large-scale wind power.

DETAILED DESCRIPTION

The following detailed description of non-limiting embodiments refers to the accompanying drawings. The same reference numbers in different drawings may identify the same or similar elements.

To make the objects, technical solutions, and advantages of the present invention clearer and more explicit, the present invention will be further described in detail below with reference to the accompanying drawings and by way of embodiments. It should be understood that the specific embodiments described herein are only used to explain the present invention, and are not intended to limit the present invention.

Figure 1:
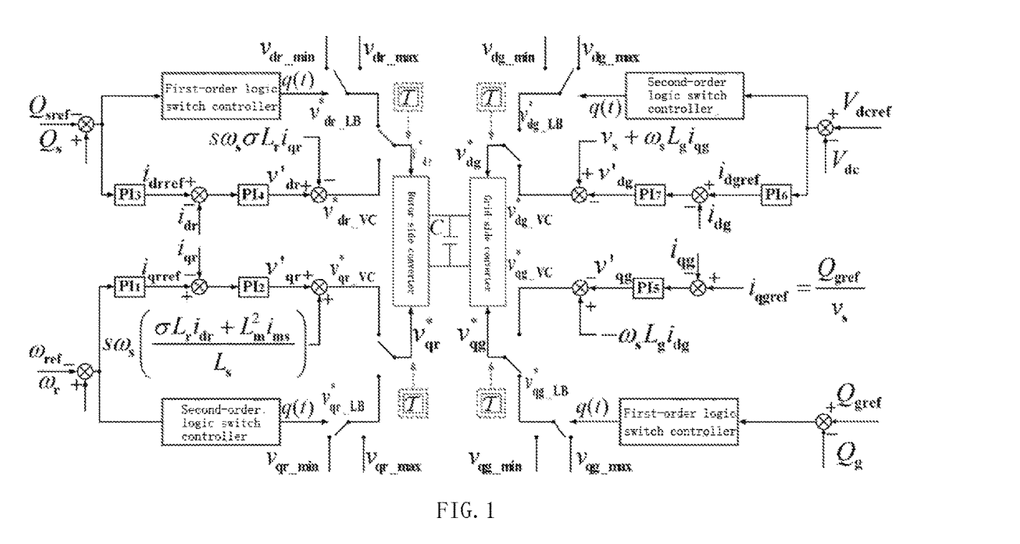
FIG. 1 is a schematic structural diagram of a non-limiting embodiment or aspect of a multi-loop switching control system for a doubly-fed wind turbine based on logic switch control.
Figure 2:
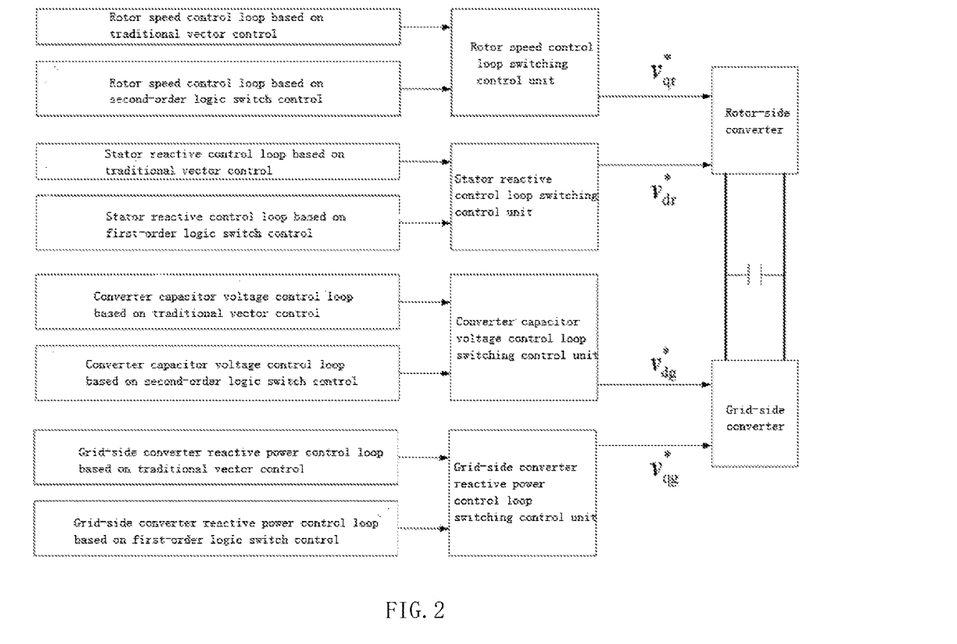
FIG. 2 is a block diagram of a non-limiting embodiment or aspect of a multi-loop switching control system for a doubly-fed wind turbine based on logic switch control.

With reference to FIGS. 1 and 2, FIG. 1 is a structural diagram and a block diagram of a multi-loop switching control system for a doubly-fed wind turbine based on logic switch control. The multi-loop switching control system may include a plurality of control loops, for example, eight control loops, and/or the like. For example, the multi-loop control system may include a doubly-fed wind turbine rotor speed control loop based on a vector control method, a doubly-fed wind turbine rotor speed switch control loop based on a second-order logic switch controller, a doubly-fed wind turbine stator reactive power control loop based on a vector control method, a doubly-fed wind turbine stator reactive power control loop based on a first-order logic switch controller, a doubly-fed wind turbine converter capacitor voltage control loop based on a vector control method, a doubly-fed wind turbine capacitor voltage control loop based on a second-order logic switch controller, a doubly-fed wind turbine grid-side converter reactive power control loop based on a vector control method, and a doubly-fed wind turbine grid-side converter reactive power control loop based on a first-order logic switch controller. As an example, a control loop may include a controller, a programmable logic device, a computer including one or more processors, one or more electrical components (e.g., resistors, capacitors, and inductors, etc.), and/or the like programmed or configured to provide a control signal or output based on an input signal or input. The multi-look switching control system may include a plurality of switching units, for example, four switching units, and/or the like. For example, the multi-loop control system may include a doubly-fed wind turbine rotor speed control loop switching control unit, a doubly-fed wind turbine stator reactive power control loop switching control unit, a doubly-fed wind turbine converter capacitor voltage control loop switching control unit, and a doubly-fed wind turbine grid-side reactive power control loop switching unit.

In FIG. 1, the parameters are defined as follows: is $i_{dr}$ rotor current d-axis component, $i_{qr}$ is rotor current q-axis component, $i_{dg}$ is grid-side converter current d-axis component, $i_{qg}$ is grid-side converter current q-axis component, $V_{dc}$ is converter capacitor terminal voltage, $Q_s$ is stator reactive power output, $Q_g$ is grid-side converter reactive power output, $\omega_r$ is generator rotor speed, $\omega_{ref}$ is reference value of generator rotor speed, $Q_{sref}$ is reference value of stator reactive power output, $Q_{gref}$ is reference value of grid-side converter reactive power output, $V_{dcref}$ is reference value of converter capacitor terminal voltage, $L_m$ is rotor-side winding mutual inductance, $v_s$ is doubly-fed wind turbine terminal voltage, and $L_s$ is stator winding inductance value.

The doubly-fed wind turbine rotor speed control loop switching control unit is configured to control a switching action between the doubly-fed wind turbine rotor speed control loop based on a vector control method, such as a traditional vector control method as described herein, and the doubly-fed wind turbine rotor speed switch control loop based on second-order logic switch controller.

The doubly-fed wind turbine rotor speed control loop based on traditional vector control method is configured to, when the doubly-fed wind turbine rotor speed control loop switching control unit switches a control signal to the doubly-fed wind turbine rotor speed control loop based on traditional vector control method, provide the appropriate control voltage $v_{qr\_VC}^*$ according to the doubly-fed wind turbine rotor speed deviation.

The doubly-fed wind turbine rotor speed switch control loop based on second-order logic switch controller is configured to, when the doubly-fed wind turbine rotor speed switch control loop switches a control signal to a doubly-fed wind turbine rotor speed control loop based on second-order logic switch controller, provide the appropriate control voltage $v_{qr\_LB}^*$ according to the doubly-fed wind turbine rotor speed deviation.

The doubly-fed wind turbine stator reactive power control loop switching unit is configured to control a switching action between the doubly-fed wind turbine stator reactive power control loop based on traditional vector control method and the doubly-fed wind turbine stator reactive power control loop based on first-order logic switch controller.

The doubly-fed wind turbine stator reactive power control loop based on traditional vector control method is configured to, when the doubly-fed wind turbine stator reactive power control loop switching unit switches a control signal to the doubly-fed wind turbine stator reactive power control loop based on traditional vector control method, provide the appropriate control voltage $v_{dr\_VC}^*$ according to the doubly-fed wind turbine stator reactive power output error.

The doubly-fed wind turbine stator reactive power control loop based on first-order logic switch controller is configured to: when the doubly-fed wind turbine stator reactive power control loop switching unit switches a control signal to the doubly-fed wind turbine stator reactive power control loop based on first-order logic switch controller, provide the appropriate control voltage $v_{dr\_LB}^*$ according to the doubly-fed wind turbine stator reactive power output error.

The doubly-fed wind turbine converter capacitor voltage control loop switching control unit is configured to control a switching action between the doubly-fed wind turbine converter capacitor voltage control loop based on traditional vector control method and the doubly-fed wind turbine converter capacitor voltage control loop based on second-order logic switch controller.

The doubly-fed wind turbine converter capacitor voltage control loop based on traditional vector control method is configured to, when the doubly-fed wind turbine converter capacitor voltage control loop switching control unit switches a control signal to the doubly-fed wind turbine capacitor voltage control loop based on traditional vector control method, provide the appropriate control voltage $v_{dg\_VC}^*$ according to the doubly-fed wind turbine capacitor voltage deviation.

The doubly-fed wind turbine converter capacitor voltage control loop based on second-order logic switch controller is configured to, when the doubly-fed wind turbine converter capacitor voltage control loop switching control unit switches a control signal to the doubly-fed wind turbine converter capacitor voltage control loop based on second-order logic switch controller, provide the appropriate control voltage $v_{dg\_LB}^*$ according to the doubly-fed wind turbine converter capacitor voltage deviation.

The doubly-fed wind turbine grid-side converter reactive power control loop switching unit is configured to control a switching action between the doubly-fed wind turbine grid-side converter reactive power control loop based on traditional vector control method and the doubly-fed wind turbine grid-side converter reactive power control loop based on first-order logic switch controller.

The doubly-fed wind turbine grid-side converter reactive power control loop based on traditional vector control method is configured to, when the doubly-fed wind turbine grid-side converter reactive power control loop switching unit switches a control signal to the doubly-fed wind turbine grid-side converter reactive power control loop based on tradition vector control method, provide the appropriate control voltage $v_{qg\_VC}^*$ according to the doubly-fed wind turbine grid-side converter reactive power output error.

The doubly-fed wind turbine grid-side converter reactive power control loop based on first-order logic switch controller is configured to: when the doubly-fed wind turbine grid-side converter reactive power control loop switching unit switches a control signal to doubly-fed wind turbine grid-side converter reactive power control loop based on first-order logic switch controller, provide the appropriate control voltage $v_{qg\_LB}^*$ according to the doubly-fed wind turbine grid-side converter reactive power output error.

The multi-loop switching control system for a doubly-fed wind turbine based on logic switch control has a control object of a doubly-fed wind turbine converter. The control system includes four input signals, respectively a doubly-fed wind turbine rotor speed deviation $e_{\omega_r}=\omega_r-\omega_r^*$, a doubly-fed wind turbine stator reactive power output deviation $e_{Q_s}=Q_s-Q_s^*$, a doubly-fed wind turbine converter capacitor voltage deviation $e_{V_{dc}}=V_{dc}-V_{dc}^*$, and a doubly-fed wind turbine grid-side converter reactive power output error $e_{Q_g}=Q_g-V_g^*$. The four input signals respectively correspond to four control loops. The multi-loop switching control system for a doubly-fed wind turbine based on logic switch control includes four output signals, respectively a doubly-fed wind turbine rotor-side converter q-axis control voltage $v_{qr}^*$, a doubly-fed wind turbine rotor-side converter d-axis control voltage $v_{dr}^*$, a doubly-fed wind turbine grid-side converter d-axis control voltage $v_{dg}^*$, and a doubly-fed wind turbine grid-side q-axis control voltage $v_{qg}^*$. The four output signals respectively correspond to four feedback control channels. The doubly-fed wind turbine rotor speed deviation $e_{\omega_r}=\omega_r-\omega_r^*$ signal passes through the doubly-fed wind turbine rotor speed control loop based on traditional vector control method, the doubly-fed wind turbine rotor speed switch control loop based on second-order logic switch controller and the doubly-fed wind turbine rotor speed control loop switching control unit, and then outputs the doubly-fed wind turbine rotor-side converter q-axis control voltage $v_{qr}^*$. The doubly-fed wind turbine stator reactive power output deviation $e_{Q_s}=Q_s-Q_s^*$: passes through the doubly-fed wind turbine stator reactive power control loop based on traditional vector control method, the doubly-fed wind turbine stator reactive power control loop based on first-order logic switch controller and the doubly-fed wind turbine stator reactive power control loop switching unit and then outputs the doubly-fed wind turbine rotor-side converter d-axis control voltage $v_{dr}^*$. The doubly-fed wind turbine converter capacitor voltage error $e_{V_{dc}}=V_{dc}-V_{dc}^*$ passes through the doubly-fed wind turbine converter capacitor voltage control loop based on traditional vector control method, the doubly-fed wind turbine converter capacitor voltage control loop based on second-order logic switch controller and the doubly-fed wind turbine converter capacitor voltage control loop switching control unit and then outputs the doubly-fed wind turbine grid-side converter d-axis control voltage $v_{dg}^*$. The doubly-fed wind turbine grid-side converter output reactive power error $e_{Q_g}=Q_g-Q_g^*$ passes through the doubly-fed wind turbine grid-side converter reactive power control loop based on traditional vector control method, the doubly-fed feeder grid-side converter reactive power control loop based on first-order logic switch controller, and the doubly-fed wind turbine grid-side reactive power control loop switching unit, and then outputs the doubly-fed wind turbine grid-side converter q-axis control voltage $v_{qg}^*$. Accordingly, four control loops are formed.

Figure 3:
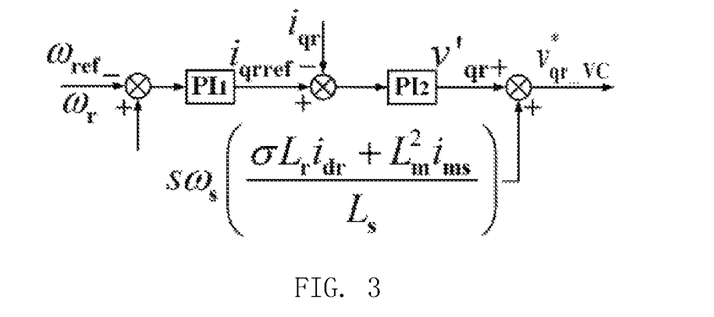
FIG. 3 is a doubly-fed wind turbine rotor speed control loop of a non-limiting embodiment aspect based on a traditional vector control method of a multi-loop switching control system for a doubly-fed wind turbine based on logic switch control.

The structure of the doubly-fed wind turbine rotor speed control loop based on traditional vector control method is as shown in FIG. 3. $\omega_r$ is the generator rotor speed, $\omega_{ref}$ is generator rotor speed reference value, $i_{qr}$ is the rotor current q-axis component, $i_{qrref}$ is the reference value of the rotor current q-axis component, $s=(\omega_s-\omega_r)/\omega_s$ is the induction generator slip, $\omega_s=2\pi f$ is synchronous speed, f (Hz) is the system frequency, $L_r$ is the rotor winding inductance value, $L_m$ is the induction generator winding mutual inductance, $i_{dr}$ is the rotor current d-axis component, $$i_{ms} = \frac{v_s - R_s i_{qs}}{\omega_s L_m}$$

is the magnetizing current of the induction generator, where $v_s$ is the doubly-fed motor stator winding terminal voltage and $R_s$ is the stator winding resistance, $$i_{qs} = -\frac{L_m i_{qr}}{L_s}$$

is stator current q-axis component, $L_s$ is the stator winding inductance value, $$\sigma = 1 - \frac{L_m^2}{L_s L_r},$$

and $PI_1$ and $PI_2$ are two proportional integral control systems, and the control parameters thereof are respectively set to: $P_1=5$, $I_1=0.1$, $P_2=10$, $I_2=70$.

Figure 4:
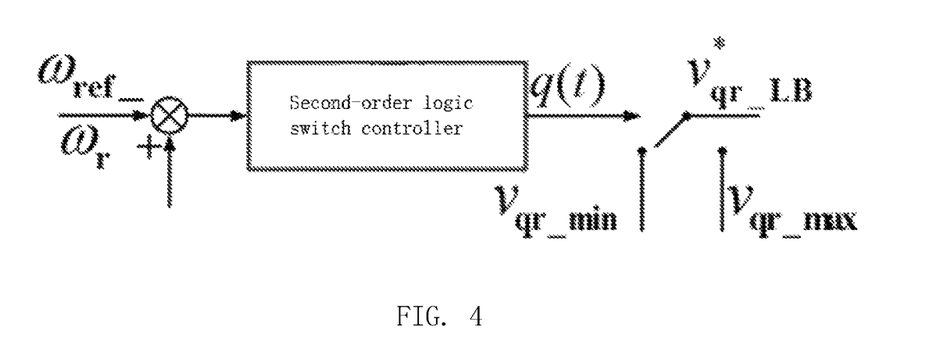
FIG. 4 is a double-fed wind turbine rotor speed switch control loop of a non-limiting embodiment or aspect based on a second-order logic switch controller of a multi-loop switching control system for a doubly-fed wind turbine based on logic switch control.

The structure of the doubly-fed wind turbine rotor speed switch control loop based on second-order logic switch controller is as shown in FIG. 4. $v_{qr\_min}$ is the minimum value of the rotor-side converter q-axis control voltage, $v_{qr\_max}$ is the maximum value of the rotor-side converter q-axis control voltage, $v_{qr\_LB}^*$ is a control signal generated by the doubly-fed wind turbine rotor speed switch control loop based on second-order logic switch controller, and $$v_{qr}(t) = \begin{cases} v_{qr\_min} & \text{if } q(t) = \text{true} \\ v_{qr\_max} & \text{if } q(t) = \text{false} \end{cases}$$

where q(t) is the output of the second-order logic switch controller system, q(t) can be calculated by the following formula $$q_1(t) = G(e(t), \varphi_0^+ - \varepsilon_0^+, \varphi_0^- + \varepsilon_0^-, q_1(t-)), q_1(0-) = q_1^0 \in \{\text{true, false}\}$$

$$q(t) = \begin{cases} G(\dot{e}(t), -\lambda_1^- - \varepsilon_1^+, \varphi_1^- + \varepsilon_1^-, q(t-)), & \text{if } q_1(t) = \text{true} \\ G(\dot{e}(t), \varphi_1^' - \varepsilon_1^+, \lambda_1^+ + \varepsilon_1^-, q(t-)), & \text{if } q_1(t) = \text{false} \end{cases}$$

$$q(0-) = q^0 \in \{\text{true, false}\}$$

where $e(t)=e_{\omega_r}(t)$, $G(e, \bar{e}, \underline{e}, q_{old})=[e \geq \bar{e} \vee (e > \underline{e} \wedge q_{old})]$, $\bar{e}$ is the upper bound of the output tracking error, $\underline{e}$ is the lower bound of the output tracking error, q(t−) is the logic value of the previous time step corresponding to the logic variable, $\wedge$ is the logic AND operation, $\vee$ is the logic OR operation, $\varphi_0^+$ and $\varphi_0^-$ define the error interval of the tracking error of the output variable, i.e. $F_0:=\{e \in \square | \varphi_0^- \leq e \leq \varphi_0^+\}$, $\varepsilon_0^+$ and $\varepsilon_0^-$ define the safety distance within $F_0$, and q (t−) is the logic value of q (t) at the previous moment, $q_1^0$ is the initial value of $q_1(t)$ when $t=0$, $\varphi_1^+$ and $\varphi_1^-$ define the error interval of the first derivative of the output variable, i.e. $F_1:=\{\dot{e} \in \square | \varphi_1^- \leq \dot{e} \leq \varphi_1^+\}$, $\varepsilon_1^+$ and $\varepsilon_1^-$ define the safe distance within $F_1$, $\lambda_1^+$ and $\lambda_1^-$ are the increasing and decreasing velocity of ideal e within $F_0$, and $q_1(t-)$ is the logic value of $q_1(t)$ at the previous moment, and $q^0$ is the initial value of q (t) when t=0. The parameters of the above control system are set as: $\varphi_0^+=4$, $\varphi_0^-=-4$, $\varepsilon_0^+=3.9$, $\varepsilon_0^-=3.9$, $\varphi_1^+=50$, $\varphi_1^-=-50$, $\varepsilon_1^+=0.4$, $\varepsilon_1^-=0.4$, $\lambda_1^+=49$, $\lambda_1^-=49$, $q_1^0=q_0=$true, $v_{qr\_min}=-5$, $v_{qr\_max}=5$.

The doubly-fed wind turbine rotor speed control loop switching control unit is $v_{qr}^*=\gamma(t)v_{qr\_LB}^*+(1-\gamma(t))v_{qr\_VC}^*$. $v_{qr\_LB}^*$ is a control signal obtained after the doubly-fed wind turbine rotor speed deviation $e_{\omega_r}=\omega_r-\omega_r^*$ passes through the doubly-fed wind turbine rotor speed switch control loop based on second-order logic switch controller, $v_{qr\_VC}^*$ is a control signal obtained after the doubly-fed wind turbine rotor speed deviation $e_{\omega_r}=\omega_r-\omega_r^*$ passes through the doubly-fed wind turbine rotor speed control loop based on traditional vector control method, and $\gamma_{\omega_r}(t)$ is the switching control strategy of the doubly-fed wind turbine rotor speed control loop $$\gamma_\omega(t) = \begin{cases} 1, & \text{if } T_1 = \text{true} \\ 0, & \text{if } T_2 = \text{true} \end{cases}$$

where, $T_1 := \{e_{\omega_r}(t) > \varphi_0^+ \text{ or } e_{\omega_r}(t) < \varphi_0^-\};$ $T_2 := \{\{(\Gamma_s - \Gamma_j)/\Gamma_s \geq \tau\} \wedge \{e_{\omega_r}(t) \text{ converges to the interval } [2(\varphi_0^- + \varepsilon_0^+), 2(\varphi_0^+ - \varepsilon_0^+)]\}\};$ where $\Gamma(t) = \{\Gamma_1, \Gamma_2, \ldots, \Gamma_j\}$ is the extreme value of the sequence $|e_{\omega_r}(t)|$, where $\Gamma_s(s \in \{1, 2, \ldots, j\})$ is the maximum value in the sequence $\Gamma(t)$, and $\tau = 0.5$ is the reduction proportion of $\Gamma_j$ relative to $\Gamma_s$.

Figure 5:
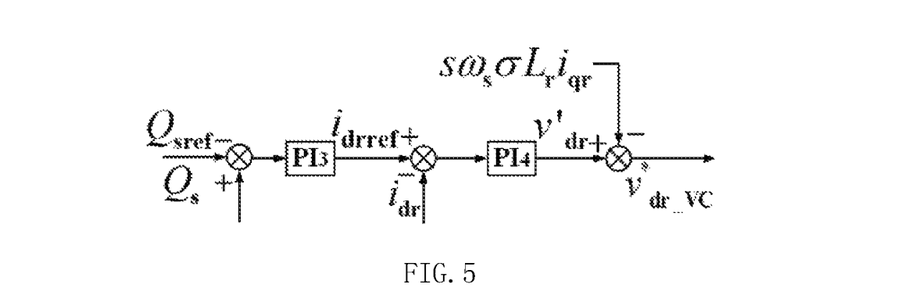
FIG. 5 is a doubly-fed wind turbine stator reactive power control loop of a non-limiting, embodiment or aspect based on a traditional vector control method of a multi-loop switching control system for a doubly-fed wind turbine based on logic switch control.

The structure of the doubly-fed wind turbine stator reactive power control loop based on traditional vector control method is as shown in FIG. 5. $Q_{sref}$ is the stator reactive power output reference value, $PI_3$ and $PI_4$ are two proportional integral control systems, and the control parameters selected as: $P_3=5$, $I_3=0.5$, $P_4=10$, $P_5=5$.

Figure 6:
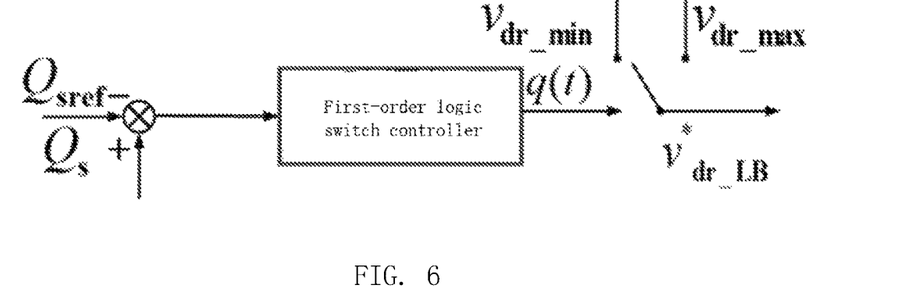
FIG. 6 is a doubly-fed wind turbine stator reactive power switch control loop of a non-limiting embodiment or aspect based on a first-order logic switch controller of a multi-loop switching control system for a doubly-fed wind turbine based on logic switch control.

The structure of the doubly-fed wind turbine stator reactive power control loop based on first-order logic switch controller is as shown in FIG. 6. $v_{dr\_min}$ is the minimum value of the rotor-side converter d-axis control voltage, $v_{dr\_max}$ is the maximum value of the rotor-side converter d-axis control voltage, and $v_{dr\_LB}^*$ is a control signal generated by the doubly-fed wind turbine stator reactive power control loop based on second-order logic switch controller, and $$v_{dr}(t) = \begin{cases} v_{dr\_max} & \text{if } q(t) = \text{true} \\ v_{dr\_min} & \text{if } q(t) = \text{false} \end{cases}$$

where $q(t)$ is the output of the first-order logic switch controller system, $q(t)$ can be calculated by the following formula $q(t) = G(e(t), \varphi_0^+ - \varepsilon_0^+, \varphi_0^- + \varepsilon_0^-, q(t-)), q(0-) = q^0 \in \{\text{true, false}\}$ where $e(t) = e_{Q_s}(t)$, the parameters of the control system are set: $v_{dr\_max} = 1.5$, $v_{dr\_min} = -1.5$, $\varphi_0^+ = 4$, $\varphi_0^- = -4$, $\varepsilon_0^+ = 3.9$, $\varepsilon_0^- = 3.9$, $q^0 = \text{true}$.

The doubly-fed wind turbine stator reactive power control loop switching control unit is $v_{dr}^* = \gamma_{Q_s}(t) v_{dr\_LB}^* + (1 - \gamma_{Q_s}(t)) v_{dr\_VC}^*$. $v_{dr\_LB}^*$ is a control signal obtained after the doubly-fed wind turbine stator reactive power deviation $e_{Q_s} = Q_s - Q_s^*$ passes through the doubly-fed wind turbine stator reactive power switch control loop based on first-order logic switch controller, $v_{dr\_VC}^*$ is a control signal obtained after the doubly-fed wind turbine stator reactive power deviation $e_{Q_s} = Q_s - Q_s^*$ passes through the doubly-fed wind turbine stator reactive power control loop based on traditional vector control method and $\gamma_{Q_s}(t)$ is a switching control strategy of the doubly-fed wind turbine stator reactive power control loop $$\gamma_{Q_s}(t) = \begin{cases} 1, & \text{if } T_1 = \text{true} \\ 0, & \text{if } T_2 = \text{true} \end{cases}$$

where, $T_1 := \{e_{\omega_r}(t) > \varphi_0^+ \text{ or } e_{\omega_r}(t) < \varphi_0^-\};$ $T_2 := \{\{(\Gamma_s - \Gamma_j)/\Gamma_s \geq \tau\} \wedge \{e_{\omega_r}(t) \text{ converges to the interval } [2(\varphi_0^- + \varepsilon_0^-), 2(\varphi_0^+ - \varepsilon_0^+)]\}\};$ where $\Gamma(t) = \{\Gamma_1, \Gamma_2, \ldots, \Gamma_j\}$ is the extreme value of the sequence $|e_{\omega_r}(t)|$, where $\Gamma_s(s \in \{1, 2, \ldots, j\})$ is the maximum value in the sequence $\Gamma(t)$, and $\tau = 0.5$ is the reduction proportion of $\Gamma_j$ relative to $\Gamma_s$.

Figure 7:
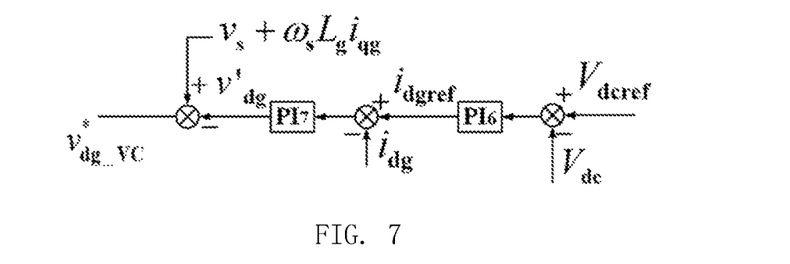
FIG. 7 is a double-fed wind turbine converter capacitor voltage control loop of a non-limiting embodiment or aspect based on a traditional vector control method of a multi-loop switching control system for a doubly-fed wind turbine based on logic switch control.

The structure of the doubly-fed wind turbine converter capacitor voltage control loop based on traditional vector control method is as shown in FIG. 7. $V_{dcref}$ is the converter capacitor voltage reference, $i_{dg}$ is the d-axis component of the grid-side converter current, $i_{qg}$ is the q-axis component of the grid-side converter current, $L_g$ is the inductive reactance of the grid-side filter inductor, and $PI_6$ and $PI_7$ are two proportional integral control systems, and the parameters thereof are set as follows: $P_6=10$, $I_6=0.5$, $P_7=11$, $I_7=5$.

Figure 8:
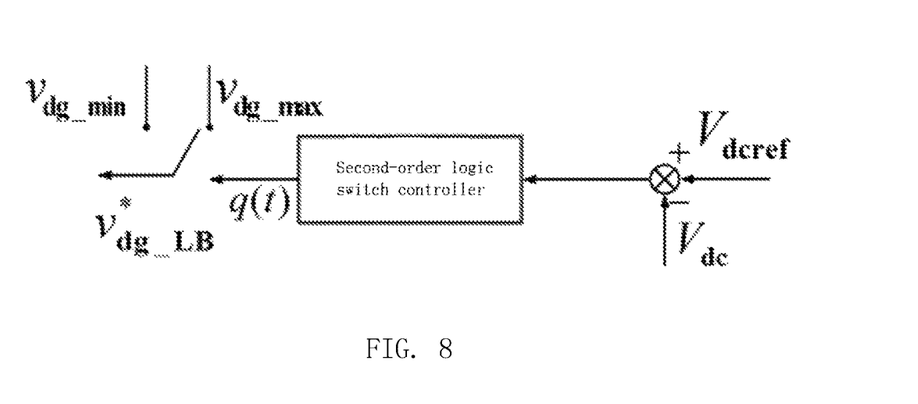
FIG. 8 is a double-fed wind turbine converter capacitor voltage switch control loop of a non-limiting embodiment or aspect based on a second-order logic switch controller of a multi-loop switching control system for a doubly-fed wind turbine based on logic switch control.

The structure of the doubly-fed wind turbine converter capacitor voltage control loop based on second-order logic switch controller is as shown in FIG. 8. $v_{dg\_min}$ is the minimum value of the grid-side converter d-axis control voltage, $v_{dg\_max}$ is the maximum value of the grid-side converter d-axis control voltage, $v_{dg\_LB}^*$ is a control signal generated by the doubly-fed wind turbine rotor speed switch control loop based on second-order logic switch controller, and $$v_{dg}(t) = \begin{cases} v_{dg\_max} & \text{if } q(t) = \text{true} \\ v_{dg\_min} & \text{if } q(t) = \text{false} \end{cases}$$

where $q(t)$ is the output of the second-order logic switch controller system, and $q(t)$ can be calculated by the following formula $q_1(t) = G(e(t), \varphi_0^+ - \varepsilon_0^+, \varphi_0^- + \varepsilon_0^-, q_1(t-)), q_1(0-) = q_1^0 \in \{\text{true, false}\}$ $$q(t) = \begin{cases} G(\dot{e}(t), -\lambda_1^- - \varepsilon_1^+, \varphi_1^- + \varepsilon_1^-, q(t-)), \text{if } q_1(t) = \text{true} \\ G(\dot{e}(t), \varphi_1' - \varepsilon_1^+, \lambda_1^+ + \varepsilon_1^-, q(t-)), \text{if } q_1(t) = \text{false} \end{cases}$$

$q(0-) = q^0 \in \{\text{true, false}\}$ where $e(t) = e_{V_{dc}}(t)$, the parameters of the control system are set: $\varphi_0^+ = 4$, $\varphi_0^- = -4$, $\varepsilon_0^+ = 3.9$, $\varepsilon_0^- = 3.9$, $\varphi_1^+ = 50$, $\varphi_1^- = -50$, $\varepsilon_1^+ = 0.4$, $\varepsilon_1^- = 0.4$, $\lambda_1^+ = 49$, $\lambda_1^- = 49$, $q_1^0 = q_0 = \text{true}$, $v_{dg\_min} = -1.5$, $v_{dg\_max} = 1.5$.

The doubly-fed wind turbine converter capacitor voltage control loop switching control unit is $v_{dg}^* = \gamma_{V_{dc}}(t) v_{dg\_LB}^* + (1 - \gamma_{V_{dc}}(t)) v_{dg\_VC}^*$. $v_{dg\_LB}^*$ is a control signal obtained after the doubly-fed wind turbine converter capacitor voltage deviation $e_{V_{dc}} = V_{dc} - V_{dc}^*$ passes through the doubly-fed wind turbine converter capacitor voltage switch control loop based on second-order logic switch controller, $v_{dg\_VC}^*$ is a control signal obtained after the doubly-fed wind turbine converter capacitor voltage deviation $e_{V_{dc}} = V_{dc} - V_{dc}^*$ passes through the doubly-fed wind turbine converter capacitor voltage control loop based on traditional vector control method, and $\gamma_{V_{dc}}(t)$ is a switching control strategy of the doubly-fed wind turbine converter capacitor voltage control loop $$\gamma_{V_{dc}}(t) = \begin{cases} 1, & \text{if } T_1 = \text{true} \\ 0, & \text{if } T_2 = \text{true} \end{cases}$$

where, $T_1 := \{e_{\omega_r}(t) > \varphi_0^+ \text{ or } e_{\omega_r}(t) < \varphi_0^-\};$ $T_2 := \{\{(\Gamma_s - \Gamma_j)/\Gamma_s \geq \tau\} \wedge \{e_{\omega_r}(t) \text{ converges to the interval } [2(\varphi_0^- + \varepsilon_0^-), 2(\varphi_0^+ - \varepsilon_0^+)]\}\};$ where $\Gamma(t)=\{\Gamma_1, \Gamma_2, \ldots, \Gamma_j\}$ is the extreme value of the sequence $|e_{\omega_r}(t)|$, where $\Gamma_s(s\in\{1, 2, \ldots, j\})$ is the maximum value in the sequence $\Gamma(t)$, and $\tau=0.5$ is the reduction proportion of $\Gamma_j$ relative to $\Gamma_s$.

Figure 9:
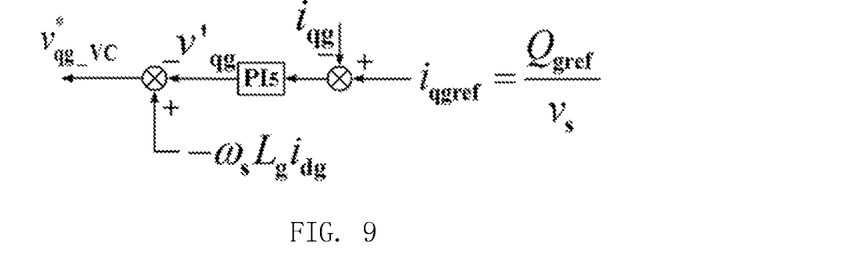
FIG. 9 is a doubly-fed wind turbine grid-side converter reactive power control loop of a non-limiting embodiment or aspect based on a traditional vector control method of a multi-loop switching control system for a doubly-fed wind turbine based on logic switch control.
Figure 10:
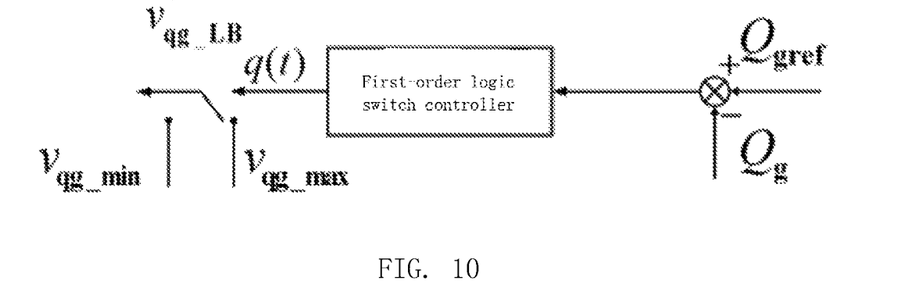
FIG. 10 is a doubly-fed wind turbine grid-side converter reactive power switch control loop of a non-limiting embodiment or aspect based on a first-order logic switch controller of a multi-loop switching control system for a doubly-fed wind turbine based on logic switch control.

The structure of the doubly-fed wind turbine grid-side converter reactive power control loop based on traditional vector control method is as shown in FIG. 9. $Q_{gref}$ is the doubly-fed wind turbine grid-side converter reactive power output, $V_s$ is the magnitude of the stator voltage, $PI_5$ is the proportional-integral control system, $i_{qg}$ is q-axis component of the grid-side converter filter current, $L_g$ is filter inductance of the grid-side converter filter, $i_{qgref}$ is the reference value of the q-axis component of the grid-side converter filter current, and $PI_5$ is the proportional integral control system, and the parameters thereof are set as: $P_5=10$, $I_5 5=5$ The structure of the doubly-fed wind turbine grid-side converter reactive power control loop based on first-order logic switch controller is as shown in FIG. 10. $v_{qg\_min}$ is the minimum value of the grid-side converter q-axis control voltage, $v_{qg\_max}$ is the maximum value of the grid-side converter q-axis control voltage, $v_{qg\_LB}^*$ is a control signal generated by the doubly-fed wind turbine grid-side converter reactive power control loop based on first-order logic switch controller, and $$v_{qg}(t) = \begin{cases} v_{qg\_min} & \text{if } q(t) = \text{true} \\ v_{qg\_max} & \text{if } q(t) = \text{false} \end{cases}$$

where $q(t)$ is the output of the second-order logic switch controller system, and $q(t)$ can be calculated by the following formula $$q(t)=G(e(t),\varphi_0^+-\varepsilon_0^+,\varphi_0^--\varepsilon_0^-,q(t-)), q(0-)=q^0\in\{\text{true, false}\}$$

where $e(t)=e_{Qg}(t)$, the parameters of the control system are set: $v_{qg\_max}=1.5$, $v_{qg\_min}=-1.5$, $\varphi_0^+=4$, $\varphi_0^-=-4$, $\varepsilon_0^+=3.9$, $\varepsilon_0^+=3.9$, $q^0=\text{true}$.

The doubly-fed wind turbine grid-side converter reactive power control loop switching control unit is $v_{qg}^*=\gamma_{Q_g}(t) v_{qg\_LB}^*+(1-\gamma_{Q_g}(t))v_{qg\_VC}^*$. $v_{qg\_LB}^*$ is a control signal obtained after the doubly-fed wind turbine grid-side converter reactive power deviation $e_{Q_g}=Q_g-Q_g^*$ passes through the doubly-fed wind turbine grid-side converter reactive power switch control loop based on first-order logic switch controller, $v_{qg\_VC}^*$ is a control signal obtained after the doubly-fed wind turbine stator reactive power deviation $e_{Q_g}=Q_g-Q_g^*$ passes through the doubly-fed wind turbine grid-side converter reactive power control loop of based on traditional vector control method, and $\gamma_{Q_g}(t)$ is a switching control strategy of the doubly-fed wind turbine stator reactive power control loop $$\gamma_{Q_g}(t) = \begin{cases} 1, & \text{if } T_1 = \text{true} \\ 0, & \text{if } T_2 = \text{true} \end{cases}$$

where, $$T_1 := \{e_{\omega_r}(t) > \varphi_0^+ \text{ or } e_{\omega_r}(t) < \varphi_0^-\};$$

$$T_2 := \{\{(\Gamma_s-\Gamma_j)/\Gamma_s \geq \tau\} \wedge \{e_{\omega_r}(t) \text{ converges to the interval } [2(\varphi_0^-+\varepsilon_0^-), 2(\varphi_0^+-\varepsilon_0^+)]\}\};$$

where $\Gamma(t)=\{\Gamma_1, \Gamma_2, \ldots, \Gamma_j\}$ is the extreme value of the sequence $|\varepsilon_{\omega_r}(t)|$, where $\Gamma_s(s\in\{1, 2, \ldots, j\})$ is the maximum value in the sequence $\Gamma(t)$, and $\tau=0.5$ is the reduction proportion of $\Gamma_j$ relative to $\Gamma_s$.

The control system further includes a switching excitation controller, the switching strategy is:

it is assumed that after the power system is perturbed, the extreme value sequence in the oscillation trajectory of the absolute value $|e(t)|$ of the output variable of the doubly-fed wind turbine is $\Gamma(t)=\{\Gamma_1, \Gamma_2, \ldots, \Gamma_j\}$, where $\Gamma_s=(s\in\{1, 2, \ldots, j\})$ is the maximum value in the sequence $\Gamma(t)$, and the switching strategy of each loop in the control system is as follows: when switching condition 1 is met, the switching control system is switched from the conventional vector controller to the switch controller; when the switching condition 2 is met, the switching control system is switched from the switch controller to the conventional vector controller, switching condition 1: $|e(t)| \geq \overline{\omega}$;

switching condition 2: {the switching excitation controller's switching frequency reaches the maximum value that the device can withstand} $\{\{(\Gamma_s-\Gamma_j)/\Gamma_s \geq \tau\} \wedge \{e(t) \text{ converges to } [2(\varphi_0^-+\varepsilon_0^-), 2(\varphi_0^+-\varepsilon_0^+)]\}\}$;

where $\overline{\omega}$ and $\tau$ are the parameters of the switching excitation controller to be designed.

Figure 11:
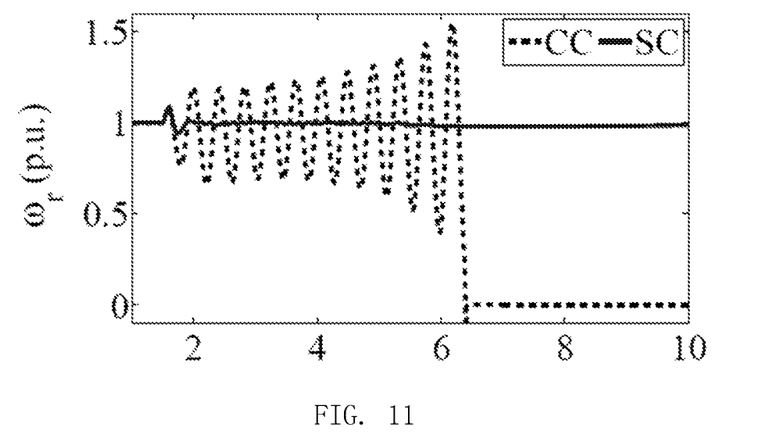
FIG. 11 is a graph of a rotation speed curve of an implementation of a non-limiting embodiment or aspect of a doubly-fed wind turbine after a three-phase short circuit fault occurs in an external power grid in a multi-loop switching control system for a doubly-fed wind turbine based on logic switch control.

FIG. 11 is a graph of a rotation speed curve of an implementation of a non-limiting embodiment or aspect of a doubly-fed wind turbine after a three-phase short circuit fault occurs in an external power grid in the multi-loop switching control system for a doubly-fed wind turbine based on logic switch control. It can be seen that under the same disturbance, the doubly-fed wind turbine based on traditional vector control algorithm has instability, and the doubly-fed wind turbine controlled by the multi-loop switching control system for a doubly-fed wind turbine based on logic switch control can return to the original balance point to continue running after the system is disturbed.

Figure 12:
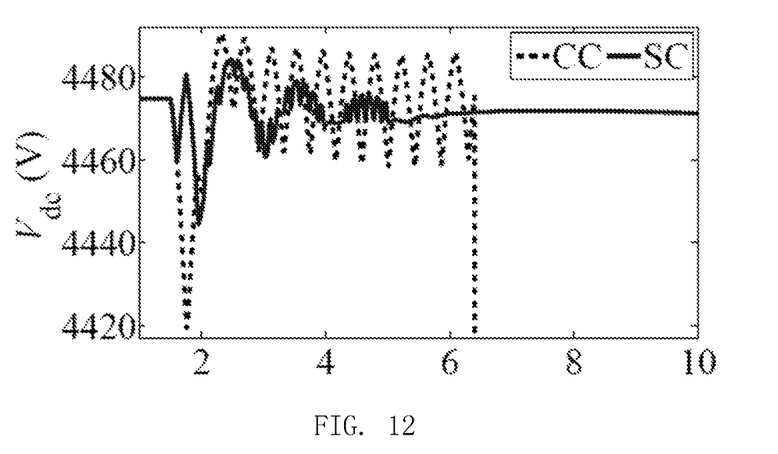
FIG. 12 is a graph of a curve of a converter capacitor voltage of an implementation of a non-limiting embodiment or aspect of a doubly-fed wind turbine after three-phase short-circuit faults occur in an external power grid of the multi-loop switching control system for a doubly-fed wind turbine based on logic switch control.

FIG. 12 is a graph of a curve of a converter capacitor voltage of an implementation of a non-limiting embodiment or aspect of a doubly-fed wind turbine after three-phase short-circuit faults occur in an external power grid of the multi-loop switching control system for a doubly-fed wind turbine based on logic switch control.

Figure 13:
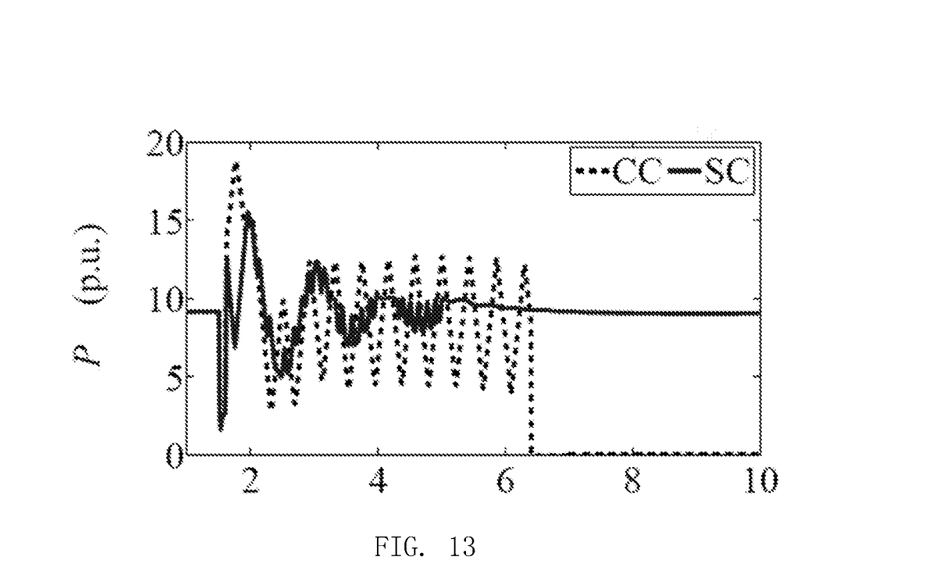
FIG. 13 is a graph of a curve of an active power output of an implementation of a non-limiting embodiment or aspect of a doubly-fed wind turbine after three-phase short-circuit faults occur in the external power network of the multi-loop switching control system for a doubly-fed wind turbine based on logic switch control.

FIG. 13 is a graph of a curve of an active power output of an implementation of a non-limiting embodiment or aspect of a doubly-fed wind turbine after three-phase short-circuit faults occur in the external power network of a multi-loop switching control system for a doubly-fed wind turbine based on logic switch control.

Figure 14:
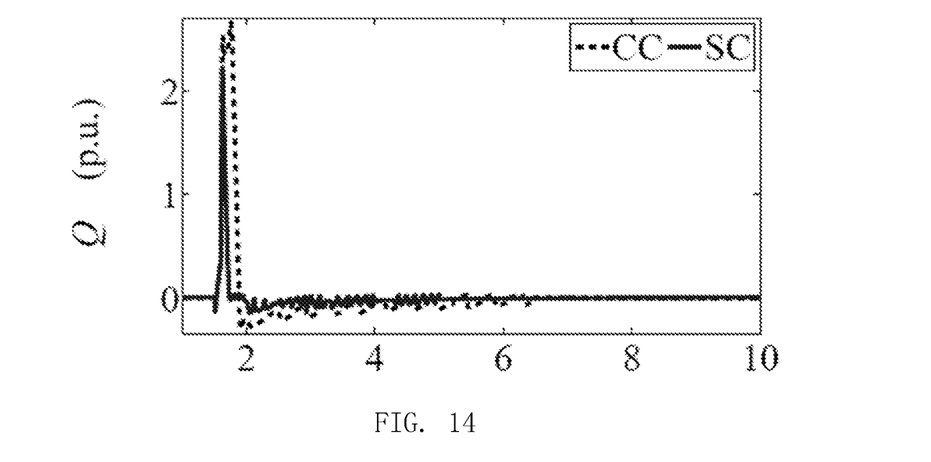
FIG. 14 is a graph of a curve of a reactive power of an implementation of a non-limiting embodiment or aspect of a doubly-fed wind turbine wind turbine after three-phase short circuits occur in the external power grid of the multi-loop switching control system for a doubly-fed wind turbine wind turbine based on logic switch control.

FIG. 14 is a graph of a curve of a reactive power of an implementation of a non-limiting embodiment or aspect of a doubly-fed wind turbine wind turbine after three-phase short circuits occur in the external power grid of a multi-loop switching control system for a doubly-fed wind turbine wind turbine based on logic switch control.

Accordingly, in a multi-loop switching controller for a doubly-fed wind turbine based on switch control according to some non-limiting embodiments or aspects, output variables of the doubly-fed wind turbine include generator rotor speed, stator-side reactive power output, grid-side converter reactive power output, back-to-back converter DC capacitor terminal voltage, and/or the like. Four feedback control channels are formed using four inputs and output variables. Each control channel switches between a switch controller and a conventional vector controller to form a four-loop switch controller. The switching strategy is as follows: when the power system where the doubly-fed wind turbine is subjected to a large external disturbance, the state variables and output variables of the wind turbine will deviate from the original balance point. At this time, the four control loops of the doubly-fed wind turbine are switched by a conventional vector controller switch to the switch controller; under the action of the switch controller, the state variables and output variables of the wind turbine will return to the vicinity of the original balance point. At this time, the four control loops of the wind turbine are switched from the switch controller to the conventional vector controller. One characteristic of a multi-loop control system according to some non-limiting embodiments or aspects is that the design of the switch controller does not depend on the exact model of the system, but only needs to know the relative order of the system model. Further, the switch controller may only have two values, i.e., the maximum value and the minimum value of the corresponding control variable. Therefore, the switch controller can give full play to the maximum energy of the doubly-fed wind turbine converter so that the system can return to the original balance point to continue running with the fastest speed. With the switch controller, the multi-loop switching controller has strong robustness to the outside disturbance.

The above embodiments are the preferred embodiments of the present invention. However, the embodiments of the present invention are not limited to the above embodiments. Any other changes, modifications, replacements, combinations, and modifications without departing from the spirit and principle of the present invention, all simplifications shall be equivalent substitutions, and are all included in the protection scope of the present invention.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code; it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

All documents, such as but not limited to issued patents and patent applications, referred to herein, and unless otherwise indicated, are to be considered to be "incorporated by reference" in their entirety.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A multi-loop switching control system based on logic switch control for controlling a doubly-fed wind turbine converter, the system comprising:
   a rotor speed control loop based on a vector control function;
   a rotor speed switch control loop including a second-order logic switch controller;
   a stator reactive power control loop based on the vector control function;
   a stator reactive power switch control loop including a first-order logic switch controller;
   a converter capacitor voltage control loop based on the vector control function;
   a converter capacitor voltage switch control loop including another second-order logic switch controller;
   a grid-side converter reactive power control loop based on the vector control function;
   a grid-side converter reactive power switch control loop including another first-order logic switch controller;
   a rotor speed control loop switching control unit;
   a stator reactive power control loop switching control unit;
   a converter capacitor voltage control loop switching control unit; and
   a grid-side converter reactive power control loop switching control unit,
   wherein the system receives a plurality of input signals including a rotor speed deviation signal, a stator reactive power output deviation signal, a converter capacitor voltage deviation signal, and a grid-side converter reactive power output error signal,
   wherein the system outputs a plurality of output signals including a rotor-side converter q-axis control voltage signal, a rotor-side converter d-axis control voltage signal, a grid-side converter d-axis control voltage signal, and a grid-side q-axis control voltage signal,
   wherein the plurality of input signals and the plurality of output signals respectively correspond to a plurality of feedback control channels,
   wherein the rotor speed deviation signal passes through the rotor speed control loop, the rotor speed switch control loop, and the rotor speed control loop switching control unit, and is output as the rotor-side converter q-axis control voltage signal, wherein the stator reactive power output deviation signal passes through the stator reactive power control loop, the stator reactive power switch control loop, and the stator reactive power control loop switching control unit, and is output as the rotor-side converter d-axis control voltage signal, wherein the converter capacitor voltage deviation signal passes through the converter capacitor voltage control loop, the converter capacitor voltage switch control loop, and the converter capacitor voltage control loop switching control unit, and is output as the grid-side converter d-axis control voltage signal, and wherein the grid-side converter output reactive power error signal passes through the grid-side converter reactive power control loop, the grid-side converter reactive power switch control loop, and the grid-side reactive power control loop switching control unit, and is output as the grid-side converter q-axis control voltage signal.

2. The multi-loop switching control system according to claim 1, wherein the rotor speed control loop switching control unit is configured to control a switching action between the rotor speed control loop and the rotor speed switch control loop;

wherein the rotor speed control loop is configured to, when the rotor speed control loop switching control unit switches to the rotor speed control loop, provide a control voltage based on the rotor speed deviation signal;

wherein the rotor speed switch control loop is configured to, when the rotor speed control loop switching control unit switches to the rotor speed switch control loop, provide a control voltage based on the rotor speed deviation signal;

wherein the reactive power control loop switching control unit is configured to control a switching action between the stator reactive power control loop and the stator reactive power switch control loop;

wherein the stator reactive power control loop is configured to, when the stator reactive power control loop switching control unit switches to the stator reactive power control loop, provide a control voltage based on the stator reactive power output error;

wherein the stator reactive power switch control loop is configured to, when the stator reactive power control loop switching control unit switches to the stator reactive power switch control loop, provide a control voltage based on the stator reactive power output error;

wherein the converter capacitor voltage control loop switching control unit is configured to control a switching action between the converter capacitor voltage control loop and the converter capacitor voltage switch control loop;

wherein the converter capacitor voltage control loop is configured to, when the converter capacitor voltage control loop switching control unit switches to the converter capacitor voltage control loop, provide a control voltage based on the converter capacitor voltage deviation;

wherein the converter capacitor voltage switch control loop is configured to, when the converter capacitor voltage control loop switching control unit switches to the converter capacitor voltage switch control loop, provide a control voltage based on the converter capacitor voltage deviation;

wherein the grid-side converter reactive power control loop switching control unit is configured to control a switching action between the grid-side converter reactive power control loop and the grid-side converter reactive power switch control loop;

wherein the grid-side converter reactive power control loop is configured to, when the grid-side converter reactive power control loop switching control unit switches to the grid-side converter reactive power control loop, provide a control voltage based on the grid-side converter reactive power output error;

wherein the grid-side converter reactive power switch control loop is configured to, when the grid-side converter reactive power control loop switching control unit switches to the grid-side converter reactive power switch control loop, provide a control voltage based on the grid-side converter reactive power output error.

3. The multi-loop switching control system according to claim 1, wherein at least one of the first-order logic switch controller and the another first-order logic switch controller generates a control signal based on the following control logic:

$$q(t)=G(e(t),\varphi_0^+-\varepsilon_0^+,\varphi_0^-+\varepsilon_0^-,q(t-)), q(0-)=q^0 \in \{\text{true, false}\}$$

where t is a moment in time, where $q^0$ is an initial value of $q^{(t)}$ when t=0, where q(t) is an output of the control logic, $G(e, \bar{e}, \underline{e}, q_{old})=[e \leq \bar{e} \vee (e > \underline{e} \vee q_{old})]$, e is a tracking error output by the system, $\bar{e}$ is an upper bound of the tracking error, $\underline{e}$ is a lower bound of the tracking error, $q_{old}$ is a logic value of a previous moment corresponding to the logic variable, $\wedge$ is the logic AND operation, $\vee$ is the logic OR operation, $\varphi_0^+$ and $\varphi_0^-$ define an error interval of the tracking error of the output variable, which is $F_0:=\{e \in \square | \varphi_0^- \leq e \leq \varphi_0^+\}$, $\varepsilon_0^+$ and $\varepsilon_0^-$ define a safety distance within $F_0$, q(t-), and is a logic value of q(t) at the previous moment.

4. The multi-loop switching control system according to claim 3, wherein at least one of the second-order logic switch controller and the another second-order logic switch controller generates a control signal based on the following control logic:

$$q_1(t) = G(e(t), \varphi_0^+ - \varepsilon_0^+, \varphi_0^- + \varepsilon_0^-, q_1(t-)), q_1(0-) = q_1^0 \in \{\text{true, false}\}$$

$$q(t) = \begin{cases} G(\dot{e}(t), -\lambda_1^- - \varepsilon_1^+, \varphi_1^- + \varepsilon_1^-, q(t-)), \text{ if } q_1(t) = \text{true} \\ G(\dot{e}(t), \varphi_1' - \varepsilon_1^+, \lambda_1^+ + \varepsilon_1^-, q(t-)), \text{ if } q_1(t) = \text{false} \end{cases}$$

$$q(0-) = q^0 \in \{\text{true, false}\}$$

where $q^{(t)}$ is an output of the control logic $G(e, \bar{e}, \underline{e}, q_{old})=[e \leq \bar{e} \vee (e > \underline{e} \vee q_{old})]$, e is a tracking error output by the system, $\bar{e}$ is an upper bound of the tracking error, $\underline{e}$ is a lower bound of the tracking error, $q_{old}$ is a logic value of a previous moment corresponding to the logic variable, $\wedge$ is the logic AND operation, $\vee$ is the logic OR operation, where $\dot{e}(t)$ is an error of a first derivative of the output variable, where $\varphi_1^+$ and $\varphi_1^-$ define an error interval of the first derivative of the output variable, which is $F_1:=\{\dot{e} \in \square | \varphi_1^- \leq \dot{e} \leq \varphi_1^+\}$, $\varepsilon_1^+$ and $\varepsilon_1^-$ define a safe distance within $F_1$, $\lambda_1^+$ and $\lambda_1^-$ are an increasing and a decreasing velocity, respectively, of ideal e within $F_0$, and $q_1(t-)$ is a logic value of $q_1(t)$ at the previous moment.

5. The multi-loop switching control system according to claim 3, wherein a control law of the second-order logic switch controller in the rotor speed switch control loop is defined according to:

$$v_{qr}(t) = \begin{cases} v_{qr\_max}, & \text{if } q(t) = \text{false} \\ v_{qr\_min}, & \text{if } q(t) = \text{true} \end{cases}$$

where $v_{dr}$ is a q-axis component of a rotor-side converter voltage, $v_{dr\_max}$ is a maximum value of the q-axis component of the rotor-side converter voltage and $v_{dr\_min}$ is a minimum value of the q-axis component of the rotor-side converter voltage.

6. The multi-loop switching control system according to claim 3, wherein a control law of the first-order logic switch controller in the stator reactive power switch control loop is defined according to:

$$v_{dr}(t) = \begin{cases} v_{dr\_max}, & \text{if } q(t) = \text{true} \\ v_{dr\_min}, & \text{if } q(t) = \text{false} \end{cases}$$

where $v_{dr}$ is a d-axis component of a rotor-side converter voltage, $v_{dr\_max}$ is a maximum value of the d-axis component of the rotor-side converter voltage and $V_{dr\_min}$ is a minimum of the d-axis component of the rotor-side converter voltage.

7. The multi-loop switching control system according to claim 3, wherein a control law of the another first-order logic switch controller in the grid-side converter reactive power switch control loop is defined according to:

$$v_{qg}(t) = \begin{cases} v_{qg\_min}, & \text{if } q(t) = \text{true} \\ v_{qg\_max}, & \text{if } q(t) = \text{false} \end{cases}$$

where $v_{qg}$ is a q-axis component of a grid-side converter voltage, $q_{qg\_max}$ is a maximum value of the q-axis component of the grid-side converter voltage, and $v_{qg\_min}$ is a minimum value of the q-axis component of the grid-side converter voltage.

8. The multi-loop switching control system according to claim 3, wherein a control law of the another second-order logic switch controller in the converter capacitor voltage switch control loop is defined according to:

$$v_{dg}(t) = \begin{cases} v_{dg\_max}, & \text{if } q(t) = \text{true} \\ v_{dg\_min}, & \text{if } q(t) = \text{false} \end{cases}$$

where $v_{dg}$ is a d-axis component of a grid-side converter voltage, $v_{dg\_max}$ is a maximum value of the d-axis component of the grid-side converter voltage, and $v_{dg\_min}$ is a minimum value of the d-axis component of the grid-side converter voltage.

9. The multi-loop switching control system according to claim 3, further comprising:

a switching excitation controller programmed or configured with the following switching strategy:

after an occurrence of a disturbance in a power system, an extreme value sequence in an oscillation trajectory of the absolute value |e(t)| of an output signal of the plurality of output signals is $\Gamma(t)=\{\Gamma_1, \Gamma_2 \ldots, \Gamma_j\}$, where $\Gamma_s=(s\in\{1, 2, \ldots, j\})$ is a maximum value in a sequence $\Gamma(t)$, and wherein the switching strategy of a feedback control channel of the plurality of feedback control channels is the following:

when switching condition 1 is met, the feedback control channel is switched from a vector controller to a switch controller, and when switching condition 2 is met, the feedback control channel is switched from the switch controller to the vector controller, wherein switching condition 1 is met when $|e(t)| \geq \overline{\omega}$; and switching condition 2 is met when a switching frequency of the switching excitation controller satisfies a maximum value defined by $\{\{(\Gamma_s-\Gamma_j)/\Gamma_s \geq \tau\} \wedge \{e(t)$ converges to $[2(\varphi_0^-+\varepsilon_0^-), 2(\varphi_0^+-\varepsilon_0^+)]\}\}$, where $\overline{\omega}$ and $\tau$ are parameters of the switching excitation controller.

* * * * *

UNITED STATES PATENT AND TRADEMARK OFFICE
CERTIFICATE OF CORRECTION

PATENT NO. : 10,447,190 B2  
APPLICATION NO. : 15/759344  
DATED : October 15, 2019  
INVENTOR(S) : Qinghua Wu et al.

Page 1 of 2

It is certified that error appears in the above-identified patent and that said Letters Patent is hereby corrected as shown below:

In the Specification

Column 5, Line 20, delete "$F_0 := \{e \in \Box \mid \varphi_0^- \leq e \leq \varphi_0^+\}$," and insert --$F_0 := \{e \in \mathbb{R} \mid \varphi_0^- \leq e \leq \varphi_0^+\}$--

Column 5, Line 36, delete "$F_1 := \{\dot{e} \in \Box \mid \varphi_1^- \leq \dot{e} \leq \varphi_1^+\}$," and insert --$F_1 := \{\dot{e} \in \mathbb{R} \mid \varphi_1^- \leq \dot{e} \leq \varphi_1^+\}$--

Column 12, Line 41, delete "$F_0 := \{e \in \Box \mid \varphi_0^- \leq e \leq \varphi_0^+\}$," and insert --$F_0 := \{e \in \mathbb{R} \mid \varphi_0^- \leq e \leq \varphi_0^+\}$--

Column 12, Lines 46-47, delete "$F_1 := \{\dot{e} \in \Box \mid \varphi_1^- \leq \dot{e} \leq \varphi_1^+\}$," and insert --$F_1 := \{\dot{e} \in \mathbb{R} \mid \varphi_1^- \leq \dot{e} \leq \varphi_1^+\}$--

In the Claims

Column 20, Line 30, Claim 3, delete "$[e \leq \bar{e} \vee (e > \underline{e} \vee q_{old})]$," and insert --$[e \geq \bar{e} \vee (e > \underline{e} \wedge q_{old})]$,--

Column 20, Line 37, Claim 3, delete "$F_0 := \{e \in \Box \mid \varphi_0^- \leq e \leq \varphi_0^+\}$," and insert --$F_0 := \{e \in \mathbb{R} \mid \varphi_0^- \leq e \leq \varphi_0^+\}$--

Column 20, Line 50, Claim 4, delete "φ'₁" and insert --$\varphi_1^+$--

Column, 20, Line 55, Claim 4, delete "$[e \leq \bar{e} \vee (e > \underline{e} \vee q_{old})]$," and insert --$[e \geq \bar{e} \vee (e > \underline{e} \wedge q_{old})]$,--

Signed and Sealed this  
Seventh Day of April, 2020

Andrei Iancu  
*Director of the United States Patent and Trademark Office*

Column 20, Line 64, Claim 4, delete "$F_i := \{\dot{e} \in \square \mid \varphi_i^- \leq \dot{e} \leq \varphi_i^+\}$," and insert --$F_i := \{\dot{e} \in \mathbb{R} \mid \varphi_i^- \leq \dot{e} \leq \varphi_i^+\}$--

Column 21, Line 11, Claim 5, delete "$V_{dr}$" and insert --$V_{qr}$--

Column 21, Line 12, Claim 5, delete "$v_{dr\_max}$" and insert --$v_{qr\_max}$--

Column 21, Line 14, Claim 5, delete "$v_{dr\_min}$" and insert --$v_{qr\_min}$--

Column 21, Line 29, Claim 6, after "minimum" insert --value--

Column 21, Line 41, Claim 7, delete "$q_{qg\_max}$" and insert --$v_{qg\_max}$--